United States Patent
Lin

(10) Patent No.: US 11,988,500 B2
(45) Date of Patent: May 21, 2024

(54) SCANNING CONTROL METHOD AND APPARATUS, SYSTEM, STORAGE MEDIUM, AND PROCESSOR

(71) Applicant: Shining 3D Tech Co., Ltd., Zhejiang (CN)

(72) Inventor: Zhongwei Lin, Zhejiang (CN)

(73) Assignee: Shining 3D Tech Co., Ltd., Zhejiang (CN)

( * ) Notice: Subject to any disclaimer, the term of this patent is extended or adjusted under 35 U.S.C. 154(b) by 309 days.

(21) Appl. No.: 17/615,838

(22) PCT Filed: Jun. 4, 2020

(86) PCT No.: PCT/CN2020/094438
§ 371 (c)(1),
(2) Date: Dec. 2, 2021

(87) PCT Pub. No.: WO2020/244594
PCT Pub. Date: Dec. 10, 2020

(65) Prior Publication Data
US 2022/0326007 A1    Oct. 13, 2022

(30) Foreign Application Priority Data

Jun. 4, 2019 (CN) .......................... 201910483144.X

(51) Int. Cl.
*G01B 11/25* (2006.01)
(52) U.S. Cl.
CPC ...... *G01B 11/2522* (2013.01); *G01B 2210/54* (2013.01)
(58) Field of Classification Search
CPC .......................... G01B 11/2522; G01B 2201/54
See application file for complete search history.

(56) References Cited

U.S. PATENT DOCUMENTS

| 2013/0063731 A1 | 3/2013 | Gaspardo et al. |
| 2015/0138320 A1 | 5/2015 | El Daher |

(Continued)

FOREIGN PATENT DOCUMENTS

| CN | 104251669 A | 12/2014 |
| CN | 105631937 A | 6/2016 |

(Continued)

OTHER PUBLICATIONS

The extended European search report of the corresponding EP patent application No. 20819156.9, mail date Jun. 21, 2022.

(Continued)

*Primary Examiner* — Jamil Ahmed
(74) *Attorney, Agent, or Firm* — Samson G. Yu

(57) ABSTRACT

The present disclosure provides a scanning control method and apparatus, a system, a storage medium, and a processor. The control method includes: controlling a scanner to preliminarily scan a to-be-scanned object according to a predetermined path to obtain a scanned model of the to-be-scanned object; determining second predetermined positions of the scanner corresponding to respective first predetermined positions of the to-be-scanned object according to the scanned model; and controlling the scanner to scan, at least at part of the second predetermined positions, the to-be-scanned object at the corresponding first predetermined positions until a three-dimensional model is obtained. According to the control method, scanning positions of the scanner are determined according to the scanned model obtained by preliminary scanning and positions of the to-be-scanned object, and part of the scanning positions are selected for scanning.

14 Claims, 2 Drawing Sheets

(56) References Cited

U.S. PATENT DOCUMENTS

| | | |
|---|---|---|
| 2016/0260250 A1 | 9/2016 | Jovanovic et al. |
| 2017/0066193 A1 | 3/2017 | Kim et al. |
| 2017/0211930 A1* | 7/2017 | Lee ..................... G01B 11/24 |

FOREIGN PATENT DOCUMENTS

| | | |
|---|---|---|
| CN | 106996752 A | 8/2017 |
| CN | 107121062 A | 9/2017 |
| CN | 109159424 A | 1/2019 |
| JP | 2011086164 A | 4/2011 |

OTHER PUBLICATIONS

Uyanik Cihan et al: "SPGS: A New Method for Autonomous 3D Reconstruction of Unknown Objects by an Industrial Robot", Jul. 21, 2018 (Jul. 21, 2018), Adcances in Biomettrics: International Conference, ICB 2007, Seoul, Korea, Aug. 27-29, 2007; Proceedings; [Lecture Notes in Computer Science; Lect. Notes Computer],Springeer, Berlin, Heidelberg, pp. 15-27, XP047480113.
Vasquex-Gomez J I et al: "View planning for 3D object reconstruction", Intelligent Robots and Systems, 2009. IROS 2009. IEEE/RSJ International Conference on, IEEE, Piscataway, NJ, USA, Oct. 10, 2009 (Oct. 10, 2009), pp. 4015-4020, XP031580743.

* cited by examiner

SCANNING CONTROL METHOD AND APPARATUS, SYSTEM, STORAGE MEDIUM, AND PROCESSOR

The present disclosure is a national stage filing of PCT Application No. PCT/CN2020/094438 filed on Jun. 4, 2020, which claims priority to Chinese patent application No. 201910483144.X, filed on Jun. 4, 2019, and entitled "Scanning Control Method and Apparatus, System, Storage Medium, and Processor", the contents of which are hereby incorporated by reference in its entirety.

TECHNICAL FIELD

The present disclosure relates to the field of three-dimensional printing, and particularly to a scanning control method and apparatus, a system, a storage medium, and a processor.

BACKGROUND ART

In a three-dimensional printing process, a mechanical arm is usually needed to control a scanner to move according to a predetermined trajectory so as to scan a real model of an object to obtain data, and then a printer performs three-dimensional printing according to the data.

In a related art, a second predetermined position of the mechanical arm needs to be acquired at first. The second predetermined position is complicated, and thus an acquisition process of the second predetermined position is relatively complicated.

The above information disclosed in background art is only used to strengthen the understanding to a background art of the technology described herein. Therefore, some information included in the background art may not be formed as a related art known to those having ordinary skill in the art in some countries.

SUMMARY

Embodiments of the present disclosure provide a scanning control method and apparatus, a system, a storage medium and a processor, which can solve the problem of complicated scanning process of a scanner in the related art.

According to an aspect of the embodiments of the present disclosure, a scanning control method is provided, which includes: controlling a scanner to preliminarily scan a to-be-scanned object according to a predetermined path to obtain a scanned model of the to-be-scanned object; determining second predetermined positions of the scanner corresponding to respective first predetermined positions of the to-be-scanned object according to the scanned model; and controlling the scanner to scan, at part of the second predetermined positions, the to-be-scanned object at the corresponding first predetermined positions until a three-dimensional model is obtained.

In at least one exemplary embodiment of the present disclosure, each of the second predetermined positions is on a scanning plane.

In at least one exemplary embodiment of the present disclosure, determining second predetermined positions of the scanner corresponding to respective first predetermined positions of the to-be-scanned object according to the scanned model includes: determining a watertight model of the to-be-scanned object according to the scanned model; and determining the second predetermined positions according to the watertight model and the respective first predetermined positions.

In at least one exemplary embodiment of the present disclosure, determining the second predetermined positions according to the watertight model and the respective first predetermined positions includes: determining a geometric center of the watertight model; determining one or more scanning spherical surfaces of the to-be-scanned object according to the geometric center and the respective first predetermined positions; and determining the second predetermined positions according to the one or more scanning spherical surfaces and the scanning plane of the scanner.

In at least one exemplary embodiment of the present disclosure, the one or more scanning spherical surfaces are one or more first scanning spherical surfaces. Determining the one or more scanning spherical surfaces according to the geometric center and the respective first predetermined positions includes: determining the one or more first scanning spherical surfaces corresponding to the to-be-scanned object at respective first predetermined positions by taking the geometric center as a sphere center and one or more predetermined distances as a radius.

In at least one exemplary embodiment of the present disclosure, the to-be-scanned object is located on a rotating carrier. The one or more scanning spherical surfaces are one or more second scanning spherical surfaces. The rotating carrier is configured to drive the to-be-scanned object to rotate about a central axis of the rotating carrier. Determining the one or more scanning spherical surfaces according to the geometric center and the respective first predetermined positions includes: determining a projective point of the geometric center on the central axis of the rotating carrier, and determining the one or more second scanning spherical surfaces corresponding to the to-be-scanned object at respective first predetermined positions by taking the projective point as a sphere center.

In at least one exemplary embodiment of the present disclosure, determining the second predetermined positions according to the one or more scanning spherical surfaces and the scanning plane of the scanner includes: determining the second predetermined positions according to a distance between the geometric center and the central axis, the one or more second scanning spherical surfaces and the scanning plane.

In at least one exemplary embodiment of the present disclosure, determining the second predetermined positions according to the watertight model and the respective first predetermined positions includes: determining boundary lines of multiple longitudinal sections corresponding to the watertight model according to the scanning plane and the respective first predetermined positions; and determining the second predetermined positions according to the boundary lines.

In at least one exemplary embodiment of the present disclosure, the boundary lines are first boundary lines. Determining boundary lines of multiple longitudinal sections corresponding to the watertight model according to the scanning plane and the respective first predetermined positions includes: determining the multiple longitudinal sections according to the scanning plane and the to-be-scanned object at the respective first predetermined positions; and determining the first boundary lines according to the multiple longitudinal sections.

In at least one exemplary embodiment of the present disclosure, the boundary lines are second boundary lines. The to-be-scanned object is located on a rotating carrier. The rotating carrier is configured to drive the to-be-scanned object to rotate about a central axis of the rotating carrier. Determining boundary lines of multiple longitudinal sections corresponding to the watertight model according to the scanning plane and the respective first predetermined positions includes: acquiring a distance between a geometric center of the watertight model and the central axis of the rotating carrier; moving each point of the watertight model by the distance to obtain a deviated model of the to-be-scanned object; determining the multiple longitudinal sections of the deviated model according to the scanning plane and the deviated model; and determining the second boundary lines according to the multiple longitudinal sections.

In at least one exemplary embodiment of the present disclosure, determining the second predetermined positions according to the boundary lines includes: determining the second predetermined positions according to the boundary lines, the scanning plane and the distance.

In at least one exemplary embodiment of the present disclosure, a second position in the second predetermined positions is a scanning position of the scanner. A first position in the first predetermined positions is a position of the to-be-scanned object corresponding to the second position. Controlling the scanner to scan, at part of the second predetermined positions, the to-be-scanned object at the corresponding first predetermined positions until a three-dimensional model is obtained includes: determining the first position and the second position according to missing data amounts of the scanned model during the scanning of the scanner at respective second predetermined positions.

In at least one exemplary embodiment of the present disclosure, controlling the scanner to scan, at part of the second predetermined positions, the to-be-scanned object at the corresponding first predetermined positions until a three-dimensional model is obtained includes: operation A1: acquiring missing data amounts of the scanned model during the scanning of the scanner at the respective second predetermined positions; operation A2: determining a second predetermined position corresponding to a maximum missing data amount as the second position, and determining a first predetermined position corresponding to the determined second predetermined position as the first position; operation A3: controlling the to-be-scanned object to be located at the first position; operation A4: controlling the scanner to scan, at the second position, the to-be-scanned object at the first position to obtain a complementary scanned model; and sequentially repeating the operation A1 to the operation A4 at least once to finally obtain the scanned model as the three-dimensional model.

In at least one exemplary embodiment of the present disclosure, the operation A1 further includes: acquiring missing data amounts of the scanned model during the scanning of the scanner at multiple view angles at the respective second predetermined positions. The operation A2 further includes: determining a view angle corresponding to a maximum missing data amount as a scanning view angle. The operation A4 further includes: controlling the scanner to perform the scanning at the scanning view angle.

According to another aspect of the embodiments of the present disclosure, a scanning control apparatus is provided, which includes: a first control unit, configured to control a scanner to preliminarily scan a to-be-scanned object according to a predetermined path to obtain a scanned model of the to-be-scanned object; a determination unit, configured to determine second predetermined positions of the scanner corresponding to respective first predetermined positions of the to-be-scanned object according to the scanned model; and a second control unit, configured to control the scanner to scan, at least at part of the second predetermined positions, the to-be-scanned object at the corresponding first predetermined positions until a three-dimensional model is obtained.

According to another aspect of the embodiments of the present disclosure, a storage medium is provided, which includes a stored program. The program is used for executing any above-mentioned control method.

According to yet another aspect of the embodiments of the present disclosure, a processor is provided, which is configured to run a program. The program, when being run, executes any above-mentioned control method.

According to another aspect of the embodiments of the present disclosure, a scanning system is provided, which includes: a mechanical arm; a scanner, connected to the mechanical arm and driven by the mechanical arm to move to respective second predetermined positions; and a rotating carrier, located on one side of the scanner and configured to bear a to-be-scanned object and drive the to-be-scanned object to rotate about a central axis of the rotating carrier.

In at least one exemplary embodiment of the present disclosure, the scanning system further includes a controller, configured to control movement of the mechanical arm and rotation of the rotating carrier.

With the application of the technical solutions of the embodiments of the present disclosure, in the scanning control method, the scanner preliminarily scans the to-be-scanned object according to the predetermined path to establish the scanned model of the to-be-scanned object. The second predetermined positions of the scanner corresponding to respective first predetermined positions of the to-be-scanned object are determined according to the scanned model. The scanner is controlled to scan at part of the second predetermined positions to perfect the scanned model until the three-dimensional model is obtained. According to the control method, scanning positions of the scanner are determined according to the scanned model obtained by preliminary scanning and positions of the to-be-scanned object, and part of the scanning positions are selected for scanning. The intersection and overlapping of scanning ranges are avoided, and the scanning count is reduced, so that a process of scanning the three-dimensional model is simpler than the related art.

BRIEF DESCRIPTION OF THE DRAWINGS

The accompanying drawings constituting a part of the present disclosure in the specification are used to provide a further understanding to the present disclosure. Schematic embodiments of the present disclosure and descriptions thereof are used to explain the present disclosure and are not intended to constitute improper limitation to the present disclosure. In the drawings.

DETAILED DESCRIPTION OF THE EMBODIMENTS

It is to be noted that embodiments of the present disclosure and features in the embodiments can be combined with each other without conflicts. The present disclosure will be described below with reference to the drawings and in combination with the embodiments in detail.

In order to make the solutions of the embodiments of the present disclosure understood better by those having ordinary skill in the art, the technical solutions in the embodiments of the present disclosure will be described clearly and completely below in combination with the drawings in the embodiments of the present disclosure. It is apparent that the described embodiments are not all but only part of embodiments of the present disclosure. All other embodiments obtained by those of ordinary skill in the art based on the embodiments of the present disclosure without creative work shall fall within the scope of protection of the present disclosure.

It is to be noted that terms "first", "second" and the like in the specification and claims of the present disclosure and the foregoing drawings are used to distinguish similar objects rather than necessarily describe a specific order or sequence. It is to be understood that data used like this may be interchanged where appropriate for the ease of describing the embodiments of the present disclosure herein. In addition, terms "comprise" and "have" and any transformations thereof are intended to cover nonexclusive inclusions. For example, a process, method, system, product or device including a series of operations or units is not necessarily limited to those clearly listed operations or units, but may include other operations or units that are not clearly listed or inherent to the process, the method, the product or the device.

As introduced in background art, a scanning process of a scanner in the related art is complicated. In order to solve this problem, the embodiments of the present disclosure provide a scanning control method. The method includes the following operations.

Figure 1:
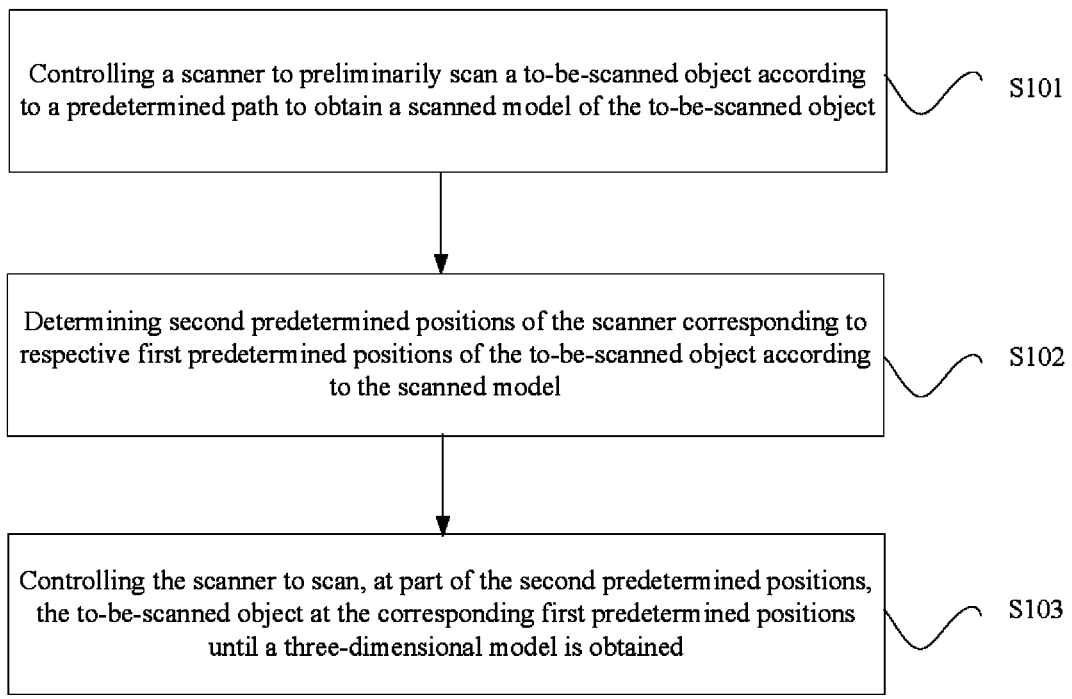
FIG. 1 is a schematic flowchart of a scanning control method according to an embodiment of the present disclosure.

FIG. 1 is a flowchart of a scanning control method according to an embodiment of the present disclosure. As shown in FIG. 1, the method includes the following operations S101 to S103.

In S101, a scanner is controlled to preliminarily scan a to-be-scanned object according to a predetermined path to obtain a scanned model of the to-be-scanned object.

In S102, second predetermined positions of the scanner corresponding to respective first predetermined positions of the to-be-scanned object are determined according to the scanned model.

In S103, the scanner is controlled to scan, at part of the second predetermined positions, the to-be-scanned object at the corresponding first predetermined positions until a three-dimensional model is obtained.

In the scanning control method, first, the scanner preliminarily scans the to-be-scanned object according to the predetermined path to establish the scanned model of the to-be-scanned object. Then, the second predetermined positions of the scanner corresponding to respective first predetermined positions of the to-be-scanned object are determined according to the scanned model. Finally, the scanner is controlled to scan at part of the second predetermined positions to perfect the scanned model until the three-dimensional model is obtained. According to the control method, scanning positions of the scanner are determined according to the scanned model obtained by preliminary scanning and positions of the to-be-scanned object, and part of the scanning positions are selected for scanning. The intersection and overlapping of scanning ranges are avoided, and the scanning count is reduced, so that a process of scanning the three-dimensional model is simpler than the related art.

It is to be noted that the predetermined path is a moving path of the scanner when performing a set of scanning every time when the to-be-scanned object is moved to another position during preliminary scanning. In an exemplary implementation, the to-be-scanned object is in a rotational state when being scanned. The scanner is controlled to perform a set of scanning every time when the to-be-scanned object rotates 90 degrees. The scanner is controlled to scan at two positions during each set of scanning.

In order to simplify a moving trajectory of the scanner to further simplify a process of scanning the three-dimensional model, in an embodiment of the present disclosure, each of the second predetermined positions is on a scanning plane. When the scanner is controlled to scan, at part of the second predetermined positions, the to-be-scanned object at the corresponding first predetermined positions, the selected part of second predetermined positions are second predetermined positions on the scanning plane. In the scanning process, the scanner only needs to move on a two-dimensional plane rather than in a three-dimensional space. Therefore, the moving trajectory of the scanner is simplified, and the process of scanning the three-dimensional model is further simplified.

In order to determine accurate second predetermined positions to accurately obtain the three-dimensional model of the to-be-scanned object, in an embodiment of the present disclosure, the operation that second predetermined positions of the scanner corresponding to respective first predetermined positions of the to-be-scanned object are determined according to the scanned model includes the following operations. A watertight model of the to-be-scanned object is determined according to the scanned model. The second predetermined positions are determined according to the watertight model and the respective first predetermined positions. The watertight model is established to conveniently determine feature points of the to-be-scanned object, e.g., a geometric center and a vertex, thereby conveniently determining accurate second predetermined positions.

In a practical scanning process, there are many implementation modes for determining the second predetermined positions according to the watertight model and the respective first predetermined positions. In an embodiment of the present disclosure, the operation that the second predetermined positions are determined according to the watertight model and the respective first predetermined positions includes the following operations. A geometric center of the watertight model is determined. One or more scanning spherical surfaces of the to-be-scanned object are determined according to the geometric center and the respective first predetermined positions. It is to be noted that there may be multiple or only one scanning spherical surface here. For an irregularly shaped to-be-scanned object, positions of a geometric center of a corresponding watertight model of the to-be-scanned object may be different when the to-be-scanned object rotates to different positions. In such case, multiple scanning spherical surfaces may be obtained for multiple first predetermined positions. For a regularly shaped to-be-scanned object, positions of a geometric center of a corresponding watertight model of the to-be-scanned object may be the same when the to-be-scanned object rotates to different positions. In such case, one scanning spherical surface may be obtained for multiple first predetermined positions. In addition, the scanning spherical surface practically also needs to be determined according to a predetermined distance. The predetermined distance is a radius of the scanning spherical surface. The second predetermined positions are determined according to the one or more scanning spherical surfaces and the scanning plane of the scanner. The radius of the scanning spherical surface is an optimal scanning distance of the scanner. A trajectory formed by the second predetermined positions is on an intersecting line of the scanning plane and the scanning spherical surface. Each second predetermined position is subsequently determined according to a preset spacing of adjacent second predetermined positions and the like. The second predetermined positions determined in this manner can reduce the intersection and overlapping of scanning ranges and reduce the scanning count, thereby simplifying the process of scanning the three-dimensional model.

In an exemplary embodiment, the one or more scanning spherical surfaces are one or more first scanning spherical surfaces. The operation that the one or more scanning spherical surfaces are determined according to the geometric center and the respective first predetermined positions includes that: the one or more first scanning spherical surfaces corresponding to the to-be-scanned object at respective first predetermined positions are determined by taking the geometric center as a sphere center and one or more predetermined distances as a radius. In this manner, the one or more first scanning spherical surfaces are directly determined according to the geometric center of the to-be-scanned object at respective first predetermined positions and the one or more predetermined distances. The process is simpler, and the second predetermined positions can be determined more efficiently.

In a practical application process, the to-be-scanned object may be disposed on a rotating carrier. A relative position of the rotating carrier and the scanner is determined. However, a relative position of the to-be-scanned object and the scanner is undetermined. Relative positions of the to-be-scanned object and the scanner are different when the to-be-scanned object is at different first predetermined positions. In order to ensure the accuracy of the scanning spherical surface of the to-be-scanned object, in an embodiment of the present disclosure, the to-be-scanned object is located on a rotating carrier. The one or more scanning spherical surfaces are one or more second scanning spherical surfaces. The rotating carrier is configured to drive the to-be-scanned object to rotate about a central axis of the rotating carrier. The operation that the one or more scanning spherical surfaces are determined according to the geometric center and the respective first predetermined positions includes the following operations. A projective point of the geometric center on the central axis of the rotating carrier is determined. The one or more second scanning spherical surfaces corresponding to the to-be-scanned object at respective first predetermined positions are determined by taking the projective point as a sphere center. According to the method, the scanning spherical surfaces can be prevented from being deviated by different relative positions of the to-be-scanned object and the scanner, thereby obtaining the second predetermined positions more accurately and further ensuring that the three-dimensional model is the same as the to-be-scanned object.

In order to reduce the influence of the deviation of the geometric center on the determination of the second predetermined positions to obtain accurate second predetermined positions, in an embodiment of the present disclosure, the operation that the second predetermined positions are determined according to the one or more scanning spherical surfaces and the scanning plane of the scanner includes that: the second predetermined positions are determined according to a distance between the geometric center and the central axis, the one or more second scanning spherical surfaces and the scanning plane. Specifically, a predetermined trajectory is obtained at first according to an intersecting line of the second scanning spherical surface and the scanning plane. Then, a deviation distance of the predetermined trajectory is calculated according to the distance between the geometric center and the central axis. The obtained predetermined trajectory is moved based on the deviation distance to obtain a trajectory formed by the second predetermined positions. When the center of the to-be-scanned object is between the central axis of the rotating carrier and the scanner, the obtained predetermined trajectory is suggested to be moved away from the to-be-scanned object to obtain a trajectory formed by second predetermined positions. When the center of the to-be-scanned object is on one side of the central axis of the rotating carrier away from the scanner, the obtained predetermined trajectory is suggested to be moved close to the to-be-scanned object to obtain a trajectory formed by second predetermined positions.

In a practical application process, the way for obtaining the second predetermined positions of the scanner is not limited to the above-mentioned technical solution. In another embodiment of the present disclosure, the operation that the second predetermined positions are determined according to the watertight model and the respective first predetermined positions includes the following operations. A geometric center of the watertight model is determined. Boundary lines of multiple longitudinal sections corresponding to the watertight model are determined according to the geometric center and the respective first predetermined positions. The second predetermined positions are determined according to the boundary lines. In the method, the second predetermined positions are determined according to the boundary lines. Fewer calculations are needed, and the second predetermined positions are determined more efficiently.

There are many ways for determining the boundary lines. In an embodiment of the present disclosure, the boundary lines are first boundary lines. The operation that boundary lines of multiple longitudinal sections of the watertight model are determined according to the geometric center and the respective first predetermined positions includes the following operations. The multiple longitudinal sections are determined according to the scanning plane and the to-be-scanned object at the respective first predetermined positions. The first boundary lines are determined according to the multiple longitudinal sections. The multiple longitudinal sections are parallel to a height direction of the to-be-scanned object. A longitudinal section practically includes multiple boundary lines. Except a boundary line of which an extending direction is parallel to a plane of the rotating carrier for placing the to-be-scanned object, extending directions of the remaining boundary lines are parallel to the height direction of the to-be-scanned object. One of the remaining boundary lines is a first boundary line.

In another embodiment of the present disclosure, the boundary lines are second boundary lines. The to-be-scanned object is located on a rotating carrier. The rotating carrier is configured to drive the to-be-scanned object to rotate about a central axis of the rotating carrier. The operation that boundary lines of multiple longitudinal sections of the watertight model are determined according to the geometric center and the respective first predetermined positions includes the following operations. A distance between the geometric center and the central axis of the rotating carrier is acquired. Each point of the watertight model is moved by the distance to obtain a deviated model of the to-be-scanned object. The multiple longitudinal sections of the deviated model are determined according to the scanning plane and the deviated model. The second boundary lines are determined according to the multiple longitudinal sections. According to the method, the boundary lines can be prevented from being deviated by different relative positions of the to-be-scanned object and the scanner, thereby obtaining the second predetermined positions more accurately and further ensuring that the three-dimensional model is the same as the to-be-scanned object.

In an exemplary embodiment, the operation that the second predetermined positions are determined according to the boundary lines includes that: the second predetermined positions are determined according to the boundary lines, the scanning plane and the distance. Multiple second predetermined positions are determined according to the boundary lines. Each of the second predetermined position is at the same distance from the boundary line. Specifically, multiple predetermined positions are obtained at first according to intersections of the boundary lines and the scanning plane. Then, the multiple predetermined positions are moved by the distance to obtain multiple second predetermined positions. When the center of the to-be-scanned object is between the central axis of the rotating carrier and the scanner, the obtained predetermined positions are suggested to be moved away from the to-be-scanned object to obtain multiple second predetermined positions. When the center of the to-be-scanned object is on one side of the central axis of the rotating carrier away from the scanner, the obtained predetermined positions are suggested to be moved close to the to-be-scanned object to obtain multiple second predetermined positions.

In order to further simplify the scanning process of the scanner, in an embodiment of the present disclosure, a second position in the second predetermined positions is a scanning position of the scanner. A first position in the first predetermined positions is a position of the to-be-scanned object corresponding to the second position. The operation that the scanner is controlled to scan, at part of the second predetermined positions, the to-be-scanned object at the corresponding first predetermined positions until a three-dimensional model is obtained includes that: the first position and the second position are determined according to missing data amounts of the scanned model during the scanning of the scanner at respective second predetermined positions. In the method, a second predetermined position corresponding to a maximum missing data amount is determined as the second position, and the first predetermined position of the to-be-scanned object corresponding to the second position is determined as the first position.

In a practical application process, in order to further simplify the process of scanning to obtain the three-dimensional model of the to-be-scanned object, in an embodiment of the present disclosure, the operation that the scanner is controlled to scan, at part of the second predetermined positions, the to-be-scanned object at the corresponding first predetermined positions until a three-dimensional model is obtained includes the following operations. In operation A1, missing data amounts of the scanned model during the scanning of the scanner at the respective second predetermined positions are acquired. In operation A2, a second predetermined position corresponding to a maximum missing data amount is determined as the second position, and a first predetermined position corresponding to the determined second predetermined position is determined as the first position. In operation A3, the to-be-scanned object is controlled to be located at the first position. In operation A4, the scanner is controlled to scan, at the second position, the to-be-scanned object at the first position to obtain a complementary scanned model. The operation A1 to the operation A4 are sequentially repeated at least once to finally obtain the scanned model as the three-dimensional model.

In an exemplary embodiment, the operation A1 further includes that: missing data amounts of the scanned model during the scanning of the scanner at multiple view angles at the respective second predetermined positions are acquired. The operation A2 further includes that: a view angle corresponding to a maximum missing data amount is determined as a scanning view angle. The operation A4 further includes that: the scanner is controlled to perform scanning at the scanning view angle. Scanning at multiple view angles can enable accurate calculation of the missing data amounts of the scanned model. The second predetermined position corresponding to the maximum missing data amount may be determined as the second position. Moreover, the scanner scans at the view angle corresponding to the maximum missing data amount during scanning at the second position. Therefore, the number of the second positions is further reduced, namely the scanning count is reduced, and the process of scanning to obtain the three-dimensional model of the to-be-scanned object is simplified.

In order to ensure that those having ordinary skill in the art can understand the technical solutions of the present disclosure more clearly, the technical solutions of the present disclosure will be described below in combination with exemplary embodiments.

Embodiment 1

A to-be-scanned object placed on a turntable is preliminarily scanned to obtain a scanned model of the to-be-scanned object. A watertight model of the to-be-scanned object is acquired according to the scanned model. A geometric center of the watertight model is determined. One or more first scanning spherical surfaces of the to-be-scanned object at respective first predetermined positions are determined by taking the geometric center of the watertight model as a sphere center. Second predetermined positions of a scanner on the one or more scanning spherical surfaces are determined according to the one or more first scanning spherical surfaces and a scanning plane of the scanner. Each second predetermined position corresponds to a first predetermined position of the to-be-scanned object. Missing data amounts of the scanned model during the scanning of the scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Missing data amounts of the scanned model of the to-be-scanned object at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Iteration is sequentially performed until a complete three-dimensional model of the to-be-scanned object is obtained.

Embodiment 2

A to-be-scanned object placed on a turntable is preliminarily scanned to obtain a scanned model of the to-be-scanned object. A watertight model of the to-be-scanned object is acquired according to the scanned model. A geometric center of the watertight model is determined. One or more second scanning spherical surfaces are determined by taking a projective point of the geometric center of the to-be-scanned object on a central axis of the turntable as a sphere center. A deviation distance of the geometric center of the to-be-scanned object relative to the central axis of the turntable is determined. Second predetermined positions of a scanner are determined according to the one or more second scanning spherical surfaces, a scanning plane of the scanner and the deviation distance. Each second predetermined position corresponds to a first predetermined position of the to-be-scanned object. Missing data amounts of the scanned model during the scanning of the scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Missing data amounts of the scanned model of the to-be-scanned object at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Iteration is sequentially performed until a complete three-dimensional model of the to-be-scanned object is obtained.

Embodiment 3

A to-be-scanned object placed on a turntable is preliminarily scanned to obtain a scanned model of the to-be-scanned object. A watertight model of the to-be-scanned object is acquired according to the scanned model. A geometric center of the watertight model is determined. One or more first scanning spherical surfaces of the to-be-scanned object at respective first predetermined positions are determined by taking the geometric center of the watertight model as a sphere center. Second predetermined positions of a scanner on the one or more first scanning spherical surfaces are determined according to the one or more scanning spherical surfaces and a first scanning plane of the scanner. Each second predetermined position corresponds to a first predetermined position of the to-be-scanned object. The turntable moves to each first predetermined position, and the scanner moves to the corresponding second predetermined position for scanning. The scanned model of the to-be-scanned object is updated, to obtain a complete three-dimensional model of the to-be-scanned object.

Embodiment 4

A to-be-scanned object placed on a turntable is preliminarily scanned to obtain a scanned model of the to-be-scanned object. A watertight model of the to-be-scanned object is acquired according to the scanned model. A geometric center of the watertight model is determined. One or more second scanning spherical surfaces are determined by taking a projective point of the geometric center of the to-be-scanned object on a central axis of the turntable as a sphere center. A deviation distance of the geometric center of the to-be-scanned object relative to the central axis of the turntable is determined. Second predetermined positions of a scanner are determined according to the one or more second scanning spherical surfaces, a scanning plane of the scanner and the deviation distance. Each second predetermined position corresponds to a first predetermined position of the to-be-scanned object. The turntable moves to each first predetermined position, and the scanner moves to the corresponding second predetermined position for scanning. The scanned model of the to-be-scanned object is updated, to obtain a complete three-dimensional model of the to-be-scanned object.

Embodiment 5

A to-be-scanned object placed on a turntable is preliminarily scanned to obtain a scanned model of the to-be-scanned object. A size of a scanning field is determined according to the scanned model. The scanning field is a regular space covering all positions at the optimal scanning distance on a periphery of the to-be-scanned object. A scanning center is determined based on the size of the scanning field. One or more scanning spherical surfaces of the to-be-scanned object at respective first predetermined positions are determined by taking the scanning center as a sphere center. Second predetermined positions of the scanner on the one or more scanning spherical surfaces are determined according to the one or more scanning spherical surfaces and a first scanning plane of the scanner. Each second predetermined position corresponds to a first predetermined position of the to-be-scanned object. Analog scanning is performed based on the second predetermined positions, the first predetermined positions and a pendulum angle of the scanner. Missing data amounts of the scanned model during the analog scanning of the scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Missing data amounts of the scanned model of the to-be-scanned object at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Iteration is sequentially performed until a complete three-dimensional model of the to-be-scanned object is obtained.

Embodiment 6

A to-be-scanned object placed on a turntable is preliminarily scanned to obtain a scanned model of the to-be-scanned object. A watertight model of the to-be-scanned object is acquired according to the scanned model. First boundary lines of longitudinal sections of the watertight model at respective first predetermined positions are determined. A boundary line of which an extending direction is parallel to a height direction of the to-be-scanned object is determined as the first boundary line. Second predetermined positions corresponding to respective first predetermined positions of the to-be-scanned object is determined according to the first boundary lines and a scanning plane. Each second predetermined position corresponds to a first predetermined position of the to-be-scanned object. Missing data amounts of the scanned model during the scanning of a scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Missing data amounts of the scanned model during the scanning of the scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Iteration is sequentially performed until a complete three-dimensional model of the to-be-scanned object is obtained.

Embodiment 7

A to-be-scanned object placed on a turntable is preliminarily scanned to obtain a scanned model of the to-be-scanned object. A watertight model of the to-be-scanned object is acquired according to the scanned model. A geometric center of the watertight model is determined. A distance between the geometric center of the watertight model and a central axis of the turntable is determined. The watertight model is moved by the distance to obtain a deviated model. A second boundary line of a longitudinal section of the deviated model is determined according to the deviated model and a deviation distance. Second predetermined positions corresponding to respective first predetermined positions of the to-be-scanned object are determined according to the second boundary lines and a scanning plane. Each second predetermined position corresponds to a first predetermined position of the to-be-scanned object. Missing data amounts of the scanned model during the scanning of a scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Missing data amounts of the scanned model during the scanning of the scanner at the respective second predetermined positions are determined. The second predetermined position corresponding to a maximum missing data amount is determined as a second position. The first predetermined position of the to-be-scanned object corresponding to the second position is determined as a first position. The turntable moves to the first position, and the scanner moves to the second position for scanning. The scanned model of the to-be-scanned object is updated. Iteration is sequentially performed until a complete three-dimensional model of the to-be-scanned object is obtained.

Embodiment 8

A to-be-scanned object placed on a turntable is preliminarily scanned to obtain a scanned model of the to-be-scanned object. A watertight model of the to-be-scanned object is determined. First boundary lines of longitudinal sections of the watertight model at respective first predetermined positions are determined. A boundary line of which an extending direction is parallel to a height direction of the to-be-scanned object is determined as the first boundary line. Second predetermined positions corresponding to respective first predetermined positions of the to-be-scanned object are determined according to the first boundary lines and a scanning plane. Each second predetermined position corresponds to a first predetermined position of the to-be-scanned object. When the turntable moves to each first predetermined position, a scanner moves to the corresponding second predetermined position for scanning. The scanned model of the to-be-scanned object is updated, to obtain a complete three-dimensional model of the to-be-scanned object.

Embodiment 9

A to-be-scanned object placed on a turntable is preliminarily scanned to obtain a scanned model of the to-be-scanned object. A watertight model of the to-be-scanned object is acquired according to the scanned model. A geometric center of the watertight model is determined. A distance between the geometric center of the watertight model and a central axis of the turntable is determined. The watertight model is moved by the distance to obtain a deviated model. A second boundary line of a longitudinal section of the deviated model is determined according to the deviated model and a deviation distance. Second predetermined positions corresponding to respective first predetermined positions of the to-be-scanned object are determined according to the second boundary lines and a scanning plane. Each second predetermined position corresponds to a first predetermined position of the to-be-scanned object. When the turntable moves to each first predetermined position, a scanner moves to the corresponding second predetermined position for scanning. The scanned model of the to-be-scanned object is updated, to obtain a complete three-dimensional model of the to-be-scanned object.

An embodiment of the present disclosure provides a scanning control apparatus. It is to be noted that the scanning control apparatus of the embodiment of the present disclosure may be configured to execute the scanning control method provided in the embodiments of the present disclosure. The scanning control apparatus provided in the embodiment of the present disclosure will be introduced below.

Figure 2:
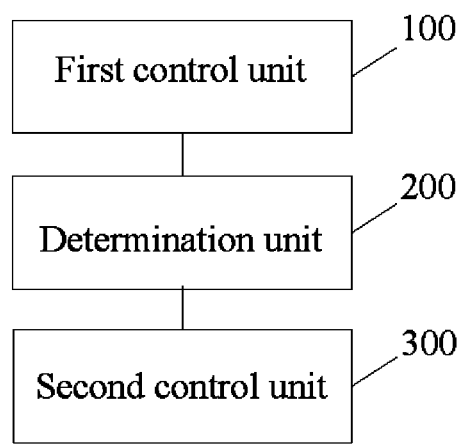
FIG. 2 is a structural block diagram of a scanning control apparatus according to an embodiment of the present disclosure.

FIG. 2 is a schematic diagram of a scanning control apparatus according to an embodiment of the present disclosure. As shown in FIG. 2, the apparatus includes:

a first control unit 100, configured to control a scanner to preliminarily scan a to-be-scanned object according to a predetermined path to obtain a scanned model of the to-be-scanned object;

a determination unit 200, configured to determine second predetermined positions of the scanner corresponding to respective first predetermined positions of the to-be-scanned object according to the scanned model; and a second control unit 300, controlling the scanner to scan, at least at part of the second predetermined positions, the to-be-scanned object at the corresponding first predetermined positions until a three-dimensional model is obtained.

In the scanning control apparatus, the first control unit controls the scanner to preliminarily scan the to-be-scanned object according to the predetermined path to establish the scanned model of the to-be-scanned object. The determination unit determines the second predetermined positions of the scanner corresponding to respective first predetermined positions of the to-be-scanned object according to the scanned model. The second control unit controls the scanner to scan at part of the second predetermined positions to perfect the scanned model until the three-dimensional model is obtained. The control apparatus determines scanning positions of the scanner according to the scanned model obtained by preliminary scanning and positions of the to-be-scanned object, and part of the scanning positions are selected for scanning. The intersection and overlapping of scanning ranges are avoided, and the scanning count is reduced, so that a process of scanning the three-dimensional model is simpler than the related art.

It is to be noted that the predetermined path is a moving path of the scanner when performing a set of scanning every time when the to-be-scanned object is moved to another position during preliminary scanning. In an exemplary implementation, the to-be-scanned object is in a rotational state when being scanned. The scanner is controlled to perform a set of scanning every time when the to-be-scanned object rotates 90 degrees. The scanner is controlled to scan at two positions during each set of scanning.

In order to simplify a moving trajectory of the scanner to further simplify a process of scanning the three-dimensional model, in an embodiment of the present disclosure, each of the second predetermined positions is on a scanning plane. When the scanner is controlled to scan, at part of the second predetermined positions, the to-be-scanned object at the corresponding first predetermined positions, the selected part of second predetermined positions are second predetermined positions on the scanning plane. In the scanning process, the scanner only needs to move on a two-dimensional plane rather than in a three-dimensional space. Therefore, the moving trajectory of the scanner is simplified, and the process of scanning the three-dimensional model is further simplified.

In order to determine accurate second predetermined positions to accurately obtain the three-dimensional model of the to-be-scanned object, in an embodiment of the present disclosure, the determination unit includes a first determination module and a second determination module. The first determination module is configured to determine a watertight model of the to-be-scanned object according to the scanned model. The second determination module is configured to determine the second predetermined positions according to the watertight model and the respective first predetermined positions. The watertight model is established to conveniently determine feature points of the to-be-scanned object, e.g., a geometric center and a vertex, thereby conveniently determining accurate second predetermined positions.

In a practical scanning process, there are many implementation modes for determining the second predetermined positions according to the watertight model and the respective first predetermined positions. In an embodiment of the present disclosure, the second determination module includes a first determination submodule, a second determination submodule, and a third determination submodule. The first determination submodule is configured to determine a geometric center of the watertight model. The second determination submodule is configured to determine one or more scanning spherical surfaces of the to-be-scanned object according to the geometric center and the respective first predetermined positions. It is to be noted that there may be multiple or only one scanning spherical surface here. For an irregularly shaped to-be-scanned object, positions of a geometric center of a corresponding watertight model of the to-be-scanned object may be different when the to-be-scanned object rotates to different positions. In such case, multiple scanning spherical surfaces may be obtained for multiple first predetermined positions. For a regularly shaped to-be-scanned object, positions of a geometric center of a corresponding watertight model of the to-be-scanned object may be the same when the to-be-scanned object rotates to different positions. In such case, one scanning spherical surface may be obtained for multiple first predetermined positions. In addition, the scanning spherical surface practically also needs to be determined according to a predetermined distance. The predetermined distance is a radius of the scanning spherical surface. The third determination submodule is configured to determine the second predetermined positions according to the one or more scanning spherical surfaces and the scanning plane of the scanner. The radius of the scanning spherical surface is an optimal scanning distance of the scanner. A trajectory formed by the second predetermined positions is on an intersecting line of the scanning plane and the scanning spherical surface. Each second predetermined position is subsequently determined according to a preset spacing of adjacent second predetermined positions and the like. The second predetermined positions determined in this manner can reduce the intersection and overlapping of scanning ranges and reduce the scanning count, thereby simplifying the process of scanning the three-dimensional model.

In an exemplary embodiment, the one or more scanning spherical surfaces are one or more first scanning spherical surfaces. The second determination submodule is further configured to determine the one or more first scanning spherical surfaces corresponding to the to-be-scanned object at respective first predetermined positions by taking the geometric center as a sphere center and one or more predetermined distances as a radius. In this manner, the one or more first scanning spherical surfaces are directly determined according to the geometric center of the to-be-scanned object at respective first predetermined positions and the one or more predetermined distances. The process is simpler, and the second predetermined positions can be determined more efficiently.

In a practical application process, the to-be-scanned object may be disposed on a rotating carrier. A relative position of the rotating carrier and the scanner is determined. However, a relative position of the to-be-scanned object and the scanner is undetermined. Relative positions of the to-be-scanned object and the scanner are different when the to-be-scanned object is at different first predetermined positions. In order to ensure the accuracy of the scanning spherical surface of the to-be-scanned object, in an embodiment of the present disclosure, the to-be-scanned object is located on a rotating carrier. The one or more scanning spherical surfaces are one or more second scanning spherical surfaces. The rotating carrier is configured to drive the to-be-scanned object to rotate about a central axis of the rotating carrier. The second determination submodule includes a fourth determination submodule and a fifth determination submodule. The fourth determination submodule is configured to determine a projective point of the geometric center on the central axis of the rotating carrier. The fifth determination submodule is configured to determine the one or more second scanning spherical surfaces corresponding to the to-be-scanned object at respective first predetermined positions by taking the projective point as a sphere center. According to the method, the scanning spherical surfaces can be prevented from being deviated by different relative positions of the to-be-scanned object and the scanner, thereby obtaining the second predetermined positions more accurately and further ensuring that the three-dimensional model is the same as the to-be-scanned object.

In order to reduce the influence of the deviation of the geometric center on the determination of the second predetermined positions to obtain accurate second predetermined positions, in an embodiment of the present disclosure, the third determination submodule is further configured to determine the second predetermined positions according to a distance between the geometric center and the central axis, the one or more second scanning spherical surfaces and the scanning plane. Specifically, a predetermined trajectory is obtained at first according to an intersecting line of the second scanning spherical surface and the scanning plane. Then, a deviation distance of the predetermined trajectory is calculated according to the distance between the geometric center and the central axis. The obtained predetermined trajectory is moved based on the deviation distance to obtain a trajectory formed by the second predetermined positions. When the center of the to-be-scanned object is between the central axis of the rotating carrier and the scanner, the obtained predetermined trajectory is suggested to be moved away from the to-be-scanned object to obtain a trajectory formed by second predetermined positions. When the center of the to-be-scanned object is on one side of the central axis of the rotating carrier away from the scanner, the obtained predetermined trajectory is suggested to be moved close to the to-be-scanned object to obtain a trajectory formed by second predetermined positions.

In a practical application process, the way for obtaining the second predetermined positions of the scanner is not limited to the above-mentioned technical solution. In another embodiment of the present disclosure, the second determination module includes a sixth determination submodule, a seventh determination submodule, and an eighth determination submodule. The sixth determination submodule is configured to determine a geometric center of the watertight model. The seventh determination submodule is configured to determine boundary lines of multiple longitudinal sections corresponding to the watertight model according to the geometric center and the respective first predetermined positions. The eighth determination submodule is configured to determine the second predetermined positions according to the boundary lines. In the method, the second predetermined positions are determined according to the boundary lines. Fewer calculations are needed, and the second predetermined positions are determined more efficiently.

There are many ways for determining the boundary lines. In an embodiment of the present disclosure, the boundary lines are first boundary lines. The seventh determination submodule includes a ninth determination submodule and a tenth determination submodule. The ninth determination submodule is configured to determine the multiple longitudinal sections according to the scanning plane and the to-be-scanned object at the respective first predetermined positions. The tenth determination submodule is configured to determine the first boundary lines according to the multiple longitudinal sections. The multiple longitudinal sections are parallel to a height direction of the to-be-scanned object. A longitudinal section practically includes multiple boundary lines. Except a boundary line of which an extending direction is parallel to a plane of the rotating carrier for placing the to-be-scanned object, extending directions of the remaining boundary lines are parallel to the height direction of the to-be-scanned object. One of the remaining boundary lines is a first boundary line.

In another embodiment of the present disclosure, the boundary lines are second boundary lines. The to-be-scanned object is located on a rotating carrier. The rotating carrier is configured to drive the to-be-scanned object to rotate about a central axis of the rotating carrier. The seventh determination submodule includes a first acquisition submodule, a second acquisition submodule, an eleventh determination submodule, and a twelfth determination submodule. The first acquisition submodule is configured to acquire a distance between the geometric center and the central axis of the rotating carrier. The second acquisition submodule is configured to move each point of the watertight model by the distance to obtain a deviated model of the to-be-scanned object. The eleventh determination submodule is configured to determine the multiple longitudinal sections of the deviated model according to the scanning plane and the deviated model. The twelfth determination submodule is configured to determine the second boundary lines according to the multiple longitudinal sections. According to the method, the boundary lines can be prevented from being deviated by different relative positions of the to-be-scanned object and the scanner, thereby obtaining the second predetermined positions more accurately and further ensuring that the three-dimensional model is the same as the to-be-scanned object.

In an exemplary embodiment, the eighth determination submodule is further configured to determine the second predetermined positions according to the boundary lines, the scanning plane and the distance. Multiple second predetermined positions are determined according to the boundary lines. Each of the second predetermined position is at the same distance from the boundary line. Specifically, multiple predetermined positions are obtained at first according to intersections of the boundary lines and the scanning plane. Then, the multiple predetermined positions are moved by the distance to obtain multiple second predetermined positions. When the center of the to-be-scanned object is between the central axis of the rotating carrier and the scanner, the obtained predetermined positions are suggested to be moved away from the to-be-scanned object to obtain multiple second predetermined positions. When the center of the to-be-scanned object is on one side of the central axis of the rotating carrier away from the scanner, the obtained predetermined positions are suggested to be moved close to the to-be-scanned object to obtain multiple second predetermined positions.

In order to further simplify the scanning process of the scanner, in an embodiment of the present disclosure, a second position in the second predetermined positions is a scanning position of the scanner. A first position in the first predetermined positions is a position of the to-be-scanned object corresponding to the second position. The second control unit is further configured to determine the first position and the second position according to missing data amounts of the scanned model during the scanning of the scanner at respective second predetermined positions. In the method, a second predetermined position corresponding to a maximum missing data amount is determined as the second position, and the first predetermined position of the to-be-scanned object corresponding to the second position is determined as the first position.

In a practical application process, in order to further simplify the process of scanning to obtain the three-dimensional model of the to-be-scanned object, in an embodiment of the present disclosure, the second control unit is further configured to acquire missing data amounts of the scanned model during the scanning of the scanner at the respective second predetermined positions, determine a second predetermined position corresponding to a maximum missing data amount as the second position, determine a first predetermined position corresponding to the determined second predetermined position as the first position, control the to-be-scanned object to be located at the first position, and control the scanner to scan, at the second position, the to-be-scanned object at the first position to obtain a complementary scanned model. The second control unit repeats these operations at least once to finally obtain the scanned model as the three-dimensional model.

In an exemplary embodiment, the second control unit is further configured to acquire missing data amounts of the scanned model during the scanning of the scanner at multiple view angles at the respective second predetermined positions. The second control unit is further configured to determine a view angle corresponding to a maximum missing data amount as a scanning view angle. The second control unit is further configured to control the scanner to perform scanning at the scanning view angle. Scanning at multiple view angles can enable accurate calculation of the missing data amounts of the scanned model. The second predetermined position corresponding to the maximum missing data amount may be determined as the second position. Moreover, the scanner scans at the view angle corresponding to the maximum missing data amount during scanning at the second position. Therefore, the number of second positions is further reduced, namely the scanning count is reduced, and the process of scanning to obtain the three-dimensional model of the to-be-scanned object is further simplified.

An embodiment of the present disclosure provides a scanning system. It is to be noted that the scanning system of the embodiment of the present disclosure may be configured to execute the scanning control method provided in the embodiment of the present disclosure. The scanning system provided in the embodiment of the present disclosure will be introduced below.

Figure 3:
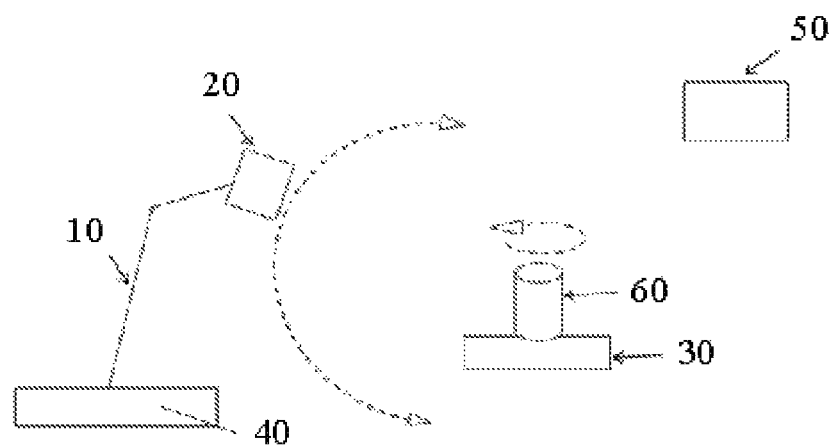
FIG. 3 is a structural schematic diagram of a scanning system according to an embodiment of the present disclosure.

FIG. 3 is a structural schematic diagram of a scanning system according to an embodiment of the present disclosure. As shown in FIG. 3, the system includes:

a mechanical arm 10;

a scanner 20, connected to the mechanical arm 10 and the scanner 20 driven by the mechanical arm 10 to move to respective second predetermined positions; and a rotating carrier 30, located on one side of the scanner 20 and configured to bear a to-be-scanned object 60 and drive the to-be-scanned object 60 to rotate about a central axis of the rotating carrier 30.

The scanning control system includes not only the mechanical arm and the scanner but also the rotating carrier. The to-be-scanned object is placed on the rotating carrier. The rotating carrier is configured to drive the to-be-scanned object to rotate about the central axis thereof. In such case, the to-be-scanned object is in a rotational state when being scanned, so the mechanical arm only needs to move on a plane parallel to the central axis of the rotating carrier to comprehensively scan the to-be-scanned object. That is, the mechanical arm and the scanner only need to move on a two-dimensional plane rather than in a three-dimensional space. According to the scanning system, moving trajectories of the mechanical arm and the scanner are relatively simple, so that a process of scanning the three-dimensional model is simpler than the related art.

In order to accurately control movement of the mechanical arm and rotation of the rotating carrier to obtain an accurate three-dimensional model, in an embodiment of the present disclosure, the scanning system further includes a controller 50. The controller 50 is configured to control the movement of the mechanical arm 10 and the rotation of the rotating carrier 30. In a practical application process, the controller, the mechanical arm and the rotating carrier may be connected to the same wireless network for communication.

In a practical application process, the controller may be any device capable of controlling the movement of the mechanical arm and the rotation of the rotating carrier. In an exemplary embodiment, the controller is a mobile phone, a pad, or the like.

In a practical scanning process, an end of the mechanical arm away from the scanner needs to be fixed to further ensure that the scanner moves according to a second predetermined position under the control of the mechanical arm, thereby further ensuring that the scanning system may accurately scan the to-be-scanned object to obtain an accurate three-dimensional model. In an embodiment of the present disclosure, as shown in FIG. 3, the scanning system further includes a base 40. The base 40 is connected to an end of the mechanical arm 10 away from the scanner 20.

The rotating carrier may be any structure capable of bearing the to-be-scanned object and driving the to-be-scanned object to rotate about the central axis. Those having ordinary skill in the art may select an appropriately shaped structure as the rotating carrier according to a practical condition. In an exemplary embodiment of the present disclosure, as shown in FIG. 3, the rotating carrier is a rotating platform.

The scanning control apparatus includes a processor and a memory. The first control unit, the determination unit, the second control unit and the like are all stored in the memory as program units. The processor executes the program units stored in the memory to realize corresponding functions.

The processor includes a core. The core calls a corresponding program unit from the memory. One or more cores may be disposed. Core parameters may be regulated to solve the problem of complicated scanning process of a scanner in the related art.

The memory may include forms of a volatile memory, Random Access Memory (RAM) and/or non-volatile memory in computer-readable media, e.g., a Read-Only Memory (ROM) or a flash RAM. The memory includes at least one storage chip.

An embodiment of the present disclosure provides a storage medium having stored therein a program which, when executed by a processor, implements the above-mentioned scanning control method.

An embodiment of the present disclosure provides a processor, which is configured to run a program. The program, when being run, executes the above-mentioned scanning control method.

An embodiment of the present disclosure provides a device, which includes a processor, a memory and a program stored in the memory and capable of running in the processor. When executing the program, the processor implements at least the following operations S101 to S103.

In S101, a scanner is controlled to preliminarily scan a to-be-scanned object according to a predetermined path to obtain a scanned model of the to-be-scanned object;

In S102: second predetermined positions of the scanner corresponding to respective first predetermined positions of the to-be-scanned object are determined according to the scanned model; and In S103: the scanner is controlled to scan, at part of the second predetermined positions, the to-be-scanned object at the corresponding first predetermined positions until a three-dimensional model is obtained.

The device herein may be a server, a Personal Computer (PC), a PAD, a mobile phone, etc. An embodiment of the present disclosure provides a computer program product, which, when executed in a data processing device, is suitable for executing a program initialized with at least the following method operations 5101 to S103.

In S101, a scanner is controlled to preliminarily scan a to-be-scanned object according to a predetermined path to obtain a scanned model of the to-be-scanned object;

In S102, second predetermined positions of the scanner corresponding to respective first predetermined positions of the to-be-scanned object are determined according to the scanned model; and In S103, the scanner is controlled to scan, at part of the second predetermined positions, the to-be-scanned object at the corresponding first predetermined positions until a three-dimensional model is obtained.

Those having ordinary skill in the art should know that the embodiments of the present disclosure may be provided as a method, a system or a computer program product. Therefore, a form of pure hardware embodiment, pure software embodiment, or embodiment integrating software and hardware may be adopted in the present disclosure. Moreover, a form of computer program product implemented on one or more computer available storage media (including, but not limited to, a disk memory, a Compact Disc ROM (CD-ROM), an optical memory, etc.) including computer-available program codes may be adopted in the embodiments of the present disclosure.

The present disclosure is described with reference to flowcharts and/or block diagrams of the method, device (system) and computer program product according to the embodiments of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, such that an apparatus for realizing a function specified in one flow or more flows in the flowcharts and/or one block or more blocks in the block diagrams is generated by the instructions executed through the computer or the processor of other programmable data processing device.

These computer program instructions may also be stored in a computer-readable memory capable of instructing the computer or other programmable data processing device to work in a specific manner, such that a product including an instruction apparatus may be generated by the instructions stored in the computer-readable memory. The instruction apparatus realizes the function specified in one flow or more flows in the flowcharts and/or one block or more blocks in the block diagrams.

These computer program instructions may also be loaded onto the computer or other programmable data processing device, such that a series of operating operations are executed in the computer or other programmable device to generate processing implemented by the computer, and operations for realizing the function specified in one flow or more flows in the flowcharts and/or one block or more blocks in the block diagrams are provided by the instructions executed in the computer or other programmable device.

In a typical configuration, a computing device includes one or more processors (CPU), an input/output interface, a network interface, and a memory.

The memory may include forms of a volatile memory, Random Access Memory (RAM) and/or non-volatile memory in computer-readable media, e.g., a Read-Only Memory (ROM) or a flash RAM. The memory is an example of the computer-readable media.

The computer-readable media include non-volatile, volatile, removable and non-removable media. Information may be stored by any method or technology. The information may be a computer-readable instruction, a data structure, a program module, or other data. Examples of the computer storage medium include, but not limited to, a Phase-Change RAM (PRAM), a Static Random Access Memory (SRAM), a Dynamic Random Access Memory (DRAM), a Random Access Memory of other types, a Read-Only Memory (ROM), an Electrically Erasable Programmable Read-Only Memory (EEPROM), a flash memory or other memory technologies, a Compact Disc Read-Only Memory (CD-ROM), a Digital Video Disk (DVD) or other optical memories, a cassette tape, a tape magnetic disk memory or other magnetic storage devices or any other non-transmission media, and may be configured to store information accessible for the computing device. It is defined herein that the computer-readable medium does not include transitory media, for example, a modulated data signal and a carrier.

It is also to be noted that terms "comprise", "include" or any other variants thereof are intended to encompass non-exclusive inclusions, thereby ensuring that a process, method, commodity or device including a series of elements not only includes those elements but also includes other elements which are not clearly listed or further includes elements inherent to the process, the method, the commodity or the device. Under the condition of no more restrictions, an element defined by statement "comprising a/an" does not exclude existence of another element which is the same in a process, method, commodity or device including the element.

Those having ordinary skill in the art should know that the embodiments of the present disclosure may be provided as a method, a system, or a computer program product. Therefore, a form of pure hardware embodiment, pure software embodiment, or embodiment integrating software and hardware may be adopted in the embodiments of the present disclosure. Moreover, a form of computer program product implemented on one or more computer available storage media (including, but not limited to, a disk memory, a CD-ROM, an optical memory, etc.) including computer-available program codes may be adopted in the embodiments of the present disclosure.

It can be seen from the above descriptions that the embodiments of the present disclosure have the following technical effects.

1) In the scanning control method of the embodiments of the present disclosure, first, the scanner preliminarily scans the to-be-scanned object according to the predetermined path to establish the scanned model of the to-be-scanned object. Then, the second predetermined positions of the scanner corresponding to respective first predetermined positions of the to-be-scanned object are determined according to the scanned model. Finally, the scanner is controlled to scan at part of the second predetermined positions to perfect the scanned model until the three-dimensional model is obtained. According to the control method, scanning positions of the scanner are determined according to the scanned model obtained by preliminary scanning and positions of the to-be-scanned object, and part of the scanning positions are selected for scanning. The intersection and overlapping of scanning ranges are avoided, and the scanning count is reduced, so that a process of scanning the three-dimensional model is simpler than the related art.

2) In the scanning control apparatus of the embodiments of the present disclosure, the first control unit controls the scanner to preliminarily scan the to-be-scanned object according to the predetermined path to establish the scanned model of the to-be-scanned object. The determination unit determines the second predetermined positions of the scanner corresponding to respective first predetermined positions of the to-be-scanned object according to the scanned model. The second control unit controls the scanner to scan at part of the second predetermined positions to perfect the scanned model until the three-dimensional model is obtained. The control apparatus determines scanning positions of the scanner according to the scanned model obtained by preliminary scanning and positions of the to-be-scanned object, and part of the scanning positions are selected for scanning. The intersection and overlapping of scanning ranges are avoided, and the scanning count is reduced, so that a process of scanning the three-dimensional model is simpler than the related art.

3) The scanning system of the embodiments of the present disclosure includes not only the mechanical arm and the scanner but also the rotating carrier. The to-be-scanned object is placed on the rotating carrier. The rotating carrier is configured to drive the to-be-scanned object to rotate about the central axis thereof. In such case, the to-be-scanned object is in a rotational state when being scanned, so the mechanical arm only needs to move on a plane parallel to the central axis of the rotating carrier to comprehensively scan the to-be-scanned object. That is, the mechanical arm and the scanner only need to move on a two-dimensional plane rather than in a three-dimensional space. According to the scanning system, moving trajectories of the mechanical arm and the scanner are relatively simple, so that a process of scanning the three-dimensional model is simpler than the related art.

The above is only the exemplary embodiments of the present disclosure and not intended to limit the present disclosure. For those having ordinary skill in the art, the present disclosure may have various modifications and variations. Any modifications, equivalent replacements, improvements and the like made within the principle of the present disclosure shall fall within the scope of protection defined by the appended claims of the present disclosure.

What is claimed is:

1. A scanning control method, comprising:
   controlling a scanner to preliminarily scan a to-be-scanned object according to a predetermined path to obtain a scanned model of the to-be-scanned model;
   determining a watertight model of the to-be-scanned object according to the scanned model;
   determining second predetermined positions of the scanner corresponding to respective first predetermined positions of the to-be-scanned object according to the watertight model and the respective first predetermined positions, wherein each of the second predetermined positions is on a scanning plane perpendicular to a plane where a rotating carrier bearing the to-be-scanned object is located, and the scanning plane is a two-dimensional plane on which the scanner is able to move; and
   controlling the scanner to scan, at part of the second predetermined positions, the to-be scanned object at the corresponding first predetermined positions until a three-dimensional model is obtained;
   wherein determining the second predetermined positions according to the watertight model and the respective first predetermined positions comprises:
   determining geometric centers of the watertight mode corresponding to the respective first predetermined positions; determining one or more scanning spherical surfaces of the to-be-scanned object according to the geometric centers and the respective first predetermined positions; and determining the second predetermined positions according to the one or more scanning spherical surfaces and the scanning plane of the scanner;
   or,
   determining boundary lines of multiple longitudinal sections corresponding to the watertight model and parallel to a height direction of the to-be-scanned object according to the scanning plane and the respective first predetermined positions; and determining the second predetermiend positions according to the boundary lines.

2. The control method according to claim 1, wherein the one or more scanning spherical surfaces are one or more first scanning spherical surfaces; and determining the one or more scanning spherical surfaces according to the geometric centers and the respective first predetermined positions comprises:
   determining the one or more first scanning spherical surfaces corresponding to the to-be-scanned object at respective first predetermined positions by taking the geometric centers as sphere centers and one or more predetermined distances as radiuses.

3. The control method according to claim 1, wherein the to-be-scanned object is located on a rotating carrier; the one or more scanning spherical surfaces are one or more second scanning spherical surfaces; the rotating carrier is configured to drive the to-be-scanned object to rotate about a central axis of the rotating carrier; and determining the one or more scanning spherical surfaces according to the geometric center and the respective first predetermined positions comprises:

determining a projective point of the geometric center on the central axis of the rotating carrier, and determining the one or more second scanning spherical surfaces corresponding to the to-be-scanned object at respective first predetermined positions by taking the projective point as a sphere center.

4. The control method according to claim 3, wherein determining the second predetermined positions according to the one or more scanning spherical surfaces and the scanning plane of the scanner comprises:

determining the second predetermined positions according to a distance between the geometric center and the central the one or more second scanning spherical surfaces and the scanning plane.

5. The control method according to claim 1, wherein the boundary lines are first boundary lines; and determining boundary lines of multiple longitudinal sections corresponding to the watertight model and parallel to a height direction of the to-be-scanned object according to the scanning plane and the respective first predetermined positions comprises:

determining the multiple longitudinal sections according to the scanning plane and the to-be-scanned object at the respective first predetermined positions, and determining the first boundary lines according to the multiple longitudinal sections.

6. The control method according to claim 1, wherein the boundary lines are second boundary lines; the to-be-scanned object is located on a rotating carrier; the rotating carrier is configured to drive the to-be-scanned object to rotate about a central axis of the rotating carrier; and determining boundary lines of multiple longitudinal sections corresponding to the watertight model and parallel to a height direction of the to-be-scanned object according to the scanning plane and the respective first predetermined positions comprises:

acquiring a distance between a geometric center of the watertight model and the central axis of the rotating carrier, moving each point of the watertight model by the distance to obtain a deviated model of the to-be-scanned object, determining multiple longitudinal sections of the deviated model according to the scanning plane and the deviated model, and determining the second boundary lines according to the multiple longitudinal sections.

7. The control method according to claim 6, wherein determining the second predetermined positions according to the boundary lines comprises:

determining the second predetermined positions according to the boundary lines, the scanning plane and the distance.

8. The control method according to claim 1, wherein a second position in the second predetermined positions is a scanning position of the scanner; a first position in the first predetermined positions is a position of the to-be-scanned object corresponding to the second position; and controlling the scanner to scan, at part of the second predetermined positions, the to-be-scanned object at the corresponding first predetermined positions until a three-dimensional model is obtained comprises:

determining the first position and the second position according to missing data amounts of the scanned model during the scanning of the scanner at respective second predetermined positions.

9. The control method according to claim 8, wherein controlling the scanner to scan, at part of the second predetermined positions, the to-be-scanned object at the corresponding first predetermined positions until a three-dimensional model is obtained comprises:

operation A1: acquiring missing data amounts of the scanned model during the scanning of the scanner at the respective second predetermined positions;

operation A2: determining a second predetermined position corresponding to a maximum missing data amount as the second position, and determining a first predetermined position corresponding to the determined second predetermined position as the first position;

operation A3: controlling the to-be-scanned object to be located at the first position;

operation A4: controlling the scanner to scan, at the second position, the to-be-scanned object at the first position to obtain a complementary scanned model; and sequentially repeating the operation A1 to the operation A4 at least once to finally obtain the scanned model as the three-dimensional model.

10. The control method according to claim 9, wherein the operation A1 further comprises: acquiring missing data amounts of the scanned model during the scanning of the scanner at multiple view angles at the respective second predetermined positions; the operation A2 further comprises: determining a view angle corresponding to a maximum missing data amount as a scanning view angle; and the operation A4 further comprises: controlling the scanner to perform the scanning at the scanning view angle.

11. A scanning control apparatus, comprising a memory storing instructions and a processor in communication with the memory, wherein the processor is configured to execute the instructions to:

control a scanner preliminarily scan a to-be-scanned object according to a predetermined path to obtain a scanned model of the to-be-scanned object;

determine a watertight model of the to-be-scanned object according to the scanned model; and determine second predetermined positions scanner corresponding to respective first predetermined positions of the to-be-scanned object according to the watertight model and the respective first predetermined positions, wherein each of the second predetermined positions is on a scanning plane perpendicular to a plane where a rotating carrier bearing the to-be-scanned object is located, and the scanning plane is a two-dimensional plane on which the scanner is able to move; and control the scanner to scan, at least at part of the second predetermined positions, the to-be scanned object at the corresponding first predetermined positions until a three-dimensional model is obtained;

wherein the processor is configured to execute the instructions to determine the second predetermined positions according to the watertight model and the respective first predetermined position in a following manner;

determining geometric centers of the watertight model corresponding to the respective first predetermined positions; determining one or more scanning spherical surfaces of the to-be-scanned objects according to the geometric centers and the respective first predetermined positions; and determining the second predetermined positions according to the one or more scanning spherical surfaces and the scanning plane of the scanner;

or, determining boundary lines of multiple longitudinal sections corresponding to the watertight model with respect to the scanning plane according to the scanning plane and the respective first predetermined positions;

and determining the second predetermined positions according to the boundary lines.

12. A non-transitory computer-readable storage medium, comprising a stored program, wherein the program is used for executing the control method according to claim 1.

13. A processor, configured to run a program, wherein the program, when being run executes the control method according to claim 1.

14. A scanning system, comprising:
a mechanical arm;
a scanner, connected to the mechanical arm and driven by the mechanical arm to move respective second predetermined positions, wherein each of the second predetermined positions is on a scanning plane perpendicular to a plane where a rotating carrier bearing the to-be-scanned object is located, and the scanning plane is a two-dimensional plane on which the scanner is able to move;
a rotating carrier, located on one side of the scanner and configured to bear a to-be-scanned object and dove the to-be-scanned object to rotate about a central axis of the rotating carrier; and
a controller, configured to control movement of the mechanical arm and rotation of the rotating carrier to implemented the control method according to claim 1.

* * * * *